(12) United States Patent
Kim et al.

(10) Patent No.: US 7,305,551 B2
(45) Date of Patent: Dec. 4, 2007

(54) METHOD OF TRANSMITTING SECURITY DATA IN AN ETHERNET PASSIVE OPTICAL NETWORK SYSTEM

(75) Inventors: A-Jung Kim, Seoul (KR); Jin-Hee Kim, Suwon-si (KR); Se-Youn Lim, Seoul (KR); Jae-Yeon Song, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 795 days.

(21) Appl. No.: 10/677,461

(22) Filed: Oct. 2, 2003

(65) Prior Publication Data

US 2004/0073788 A1   Apr. 15, 2004

(30) Foreign Application Priority Data

Oct. 2, 2002   (KR) .................... 10-2002-0060176

(51) Int. Cl.
*H04L 9/00* (2006.01)
(52) U.S. Cl. .................. 713/160; 380/278; 713/150
(58) Field of Classification Search ............... 713/150, 713/154, 160, 163; 370/469; 380/278
See application file for complete search history.

(56) References Cited

U.S. PATENT DOCUMENTS 6,963,982 B1 * 11/2005 Brustoloni et al. ........... 726/15

2002/0110245 A1 * 8/2002 Gruia ......................... 380/278

OTHER PUBLICATIONS

IEEE Std 802.11-1997 Information technology—Telecommunication and information exchange between systems Published 1997, Pertinent Pages.*

* cited by examiner

*Primary Examiner*—Gilberto Barrón
*Assistant Examiner*—Ellen Tran
(74) *Attorney, Agent, or Firm*—Cha & Reiter, LLC

(57) ABSTRACT

A method of transmitting security data from a source point to a target point in a point-to-multipoint communication system is provided. The method includes the steps of forming an encryption tag field that includes information about an encryption tag type, which indicates whether transmission data is encryption-enabled or encryption-disabled; forming a packet data field which includes encrypted transmission data; forming a first integrity check field indicating the CRC check sum of the encrypted data; forming a length and type field indicating the sum of the lengths of the packet data field and the first integrity check field. Finally, a transmission frame is formed with these formed fields, a source address field indicating the address of the source point, and a destination address field indicating the address of the target point.

11 Claims, 5 Drawing Sheets

| | PACKET | | | | | | | |
|---|---|---|---|---|---|---|---|---|
| ADDED BY TRANSMITTER, STRIPPED BY RECEIVER | DATA FRAME (SENT BY USER) | | | | | | | ADDED BY TRANSMITTER (OPTION) |
| | | DATA FRAME (DELIVERED TO USER, ONLY CRC IS OPTIONALLY STRIPPED BY RECEIVER) | | | | | | |
| PREAMBLE | SFD | DESTINATION ADDRESS | SOURCE ADDRESS | TYPE | LLC DATA | PAD | | CRC |
| 7BYTES | 1 | 6BYTES | 6BYTES | 2 | 0~1500 | 0~46 | | 4BYTES |
| | | | | HIGH-LOW | ... | ... | MSB ... LSB | |

FIG.2

METHOD OF TRANSMITTING SECURITY DATA IN AN ETHERNET PASSIVE OPTICAL NETWORK SYSTEM

CROSS REFERENCE TO RELATED APPLICATIONS

This application is related to U.S. patent application Ser. No. 10/634,700, filed Aug. 5, 2003 and entitled METHOD FOR TRANSMITTING SECURITY DATA IN ETHERNET PASSIVE OPTICAL NETWORK SYSTEM, which claims priority to an application of the same name filed in the Korean Intellectual Property Office on Aug. 7, 2002 and assigned Ser. No. 2002-46600 and U.S. patent application Ser. No. 10/659,158, filed Sep. 10, 2003 and entitled METHOD FOR CHECKING MULTICAST LLID TRANSMISSION IN ETHERNET PASSIVE OPTICAL NETWORK, which claims priority to an application of the sames name filed in the Korean Intellectual Property Office on Sep. 19, 2002 and assigned Ser. No. 2002-57297.

CLAIM OF PRIORITY

This application claims priority under 35 U.S.C. § 119 to an application entitled "Method of Transmitting Security Data in an Ethernet Passive Optical Network System," filed in the Korean Intellectual Property Office on Oct. 2, 2002 and assigned Serial No. 2002-60176, the contents of which are incorporated herein by reference.

BACKGROUND OF THE INVENTION

1. Field of the Invention

The present invention generally relates to a method of guaranteeing security over a tree-structured point-to-multipoint network. More particularly, the present invention relates to a method of transmitting security data for authenticating and guaranteeing the confidentiality of data transmitted from a source point to a target point.

2. Description of the Related Art

A plurality of network devices connected to a single network device as a root is defined as a tree-structured network. One example of the tree-structured point-to-multipoint network is a passive optical network (PON), which includes one or more ONUs (Optical Network Units) connected to one OLT (Optical Line Terminal). FIG. 1 illustrates the configuration of a typical PON.

As illustrated in FIG. 1, the PON can comprise one OLT 100, ONUs 110-1 to 110-3 connected to the OLT 100, and end users 120-1 to 120-3 connected to the respective ONUs 110-1 to 110-3. Although each ONU is shown to be connected to one end user in FIG. 1, a plurality of end users can be connected to one ONU and the ONUs 110-1 to 110-3 and the end users 120-1 to 120-3 can be connected in a point-to-multipoint tree structure.

In the existing Ethernet passive optical network (EPON) which transmits an 802.3 Ethernet frame over a tree-structured point-to-multipoint network, ONU data is accessed according to a TDM (Time Division Multiplexing) scheme for uplink transmission, and a "broadcast and selection" protocol for downlink transmission. In the downlink transmission, the OLT 100 broadcasts a downlink message destined for a particular ONU to all ONUs 110-1 to 110-3 and the intended ONU receives the message by a filtering process. However, in this arrangement, other ONUs may receive the same data. Therefore, privacy is not guaranteed.

In the uplink transmission, only an unauthenticated ONU can be connected. However, any one of the ONUs 110-1 to 110-3, disguising itself as a different ONU by spoofing its identity, can launch "denial of service" attacks or access material or resources, thus undermining the security. To prevent these problems, different keys to the ONUs 110-1 to 110-3 are distributed through an authentication procedure so that encrypted messages using the keys can be authenticated for downlink signals and uplink messages.

Encryption technologies for ATM (Asynchronous Transfer Mode) PON have been already standardized and specified in ITU-T G.983.1. However, encryption and its implementation for the EPON which transmits an Ethernet frame over a physical plant known as PON are still undefined.

FIG. 2 illustrates an exemplary message structure of a typical Ethernet frame format.

Methods of encrypting an FCS (Frame Check Sequence) as well as a message have been proposed in encrypting the message using an encryption algorithm. If an unauthenticated attacker (e.g., an unauthenticated ONU) is connected to the OLT 100 and transmits messages using an unauthenticated key, the OLT 100 decodes them using an authenticated key and then compares the check sum of the message with an FCS value. If they are different, an FCS check error is generated notifying the OLT 100 that the data or the data source is not authenticated. With the additional encryption of the FCS, however, the same FCS check error can be generated in other cases, such as a link failure and device defects. In these cases, the cause of FCS error cannot be identified. As a result, uncertainty in the cause of error leads to a link management problem.

SUMMARY OF THE INVENTION

The present invention addresses the above problem by providing a transmission method involving an encryption mechanism to guarantee confidentiality in a tree-structured point-to-multipoint network.

One aspect of the present invention is to provide a method of authenticating data or its source by an encrypted frame in a tree-structured point-to-multipoint network.

Another aspect of the present invention is to provide a transmission method involving an encryption mechanism and authentication in an EPON having a point-to-multipoint tree structure.

Still another aspect of the present invention is to provide a frame format for guaranteeing transmission security in an EPON having a point-to-multipoint tree structure.

Yet another aspect of the present invention is to provide an encryption method for distinguishing a link error during the transmission based on a message integrity error, thus enabling efficacious link management in an EPON having a point-to-multipoint tree structure.

In one embodiment, a method of transmitting security data from a source point to a target point in a point-to-multipoint communication system is provided. In the security data transmitting method, an encryption tag field is formed which includes information about an encryption tag type indicating whether transmission data is encryption-enabled or encryption-disabled and whether encryption tag information is about encryption of the data. A packet data field is formed which includes encrypted transmission data. A first integrity check field is formed, indicating the CRC check sum of the encrypted data. A length and type field a reformed, indicating the sum of the lengths of the packet data field and the first integrity check field. Finally, a transmission frame is formed with the formed fields, a source address field indicating the address of the source point, and a destination address field indicating the address of the target point.

BRIEF DESCRIPTION OF THE DRAWINGS

The above features and advantages of the present invention will become more apparent from the following detailed description when taken in conjunction with the accompanying drawings in which:

FIG. 2 illustrates an exemplary message structure being a typical Ethernet frame format;

DETAILED DESCRIPTION OF THE PREFERRED EMBODIMENT

A preferred embodiment of the present invention will be described herein below with reference to the accompanying drawings. For the purposes of clarity and simplicity, well-known functions or constructions are not described in detail as they would obscure the invention in unnecessary detail.

According to the teachings of the present invention, an Ethernet frame is inserted with an encryption tag and an integrity check (IC) field (i.e., a check field for determining whether or not a transmitted frame is from an authenticated network device). The payload and the IC field are encrypted, and an FCS for checking the presence or absence of physical errors in the encrypted fields is appended to the Ethernet frame through the processing in an Ethernet MAC (Medium Access Control) layer.

Figure 3:
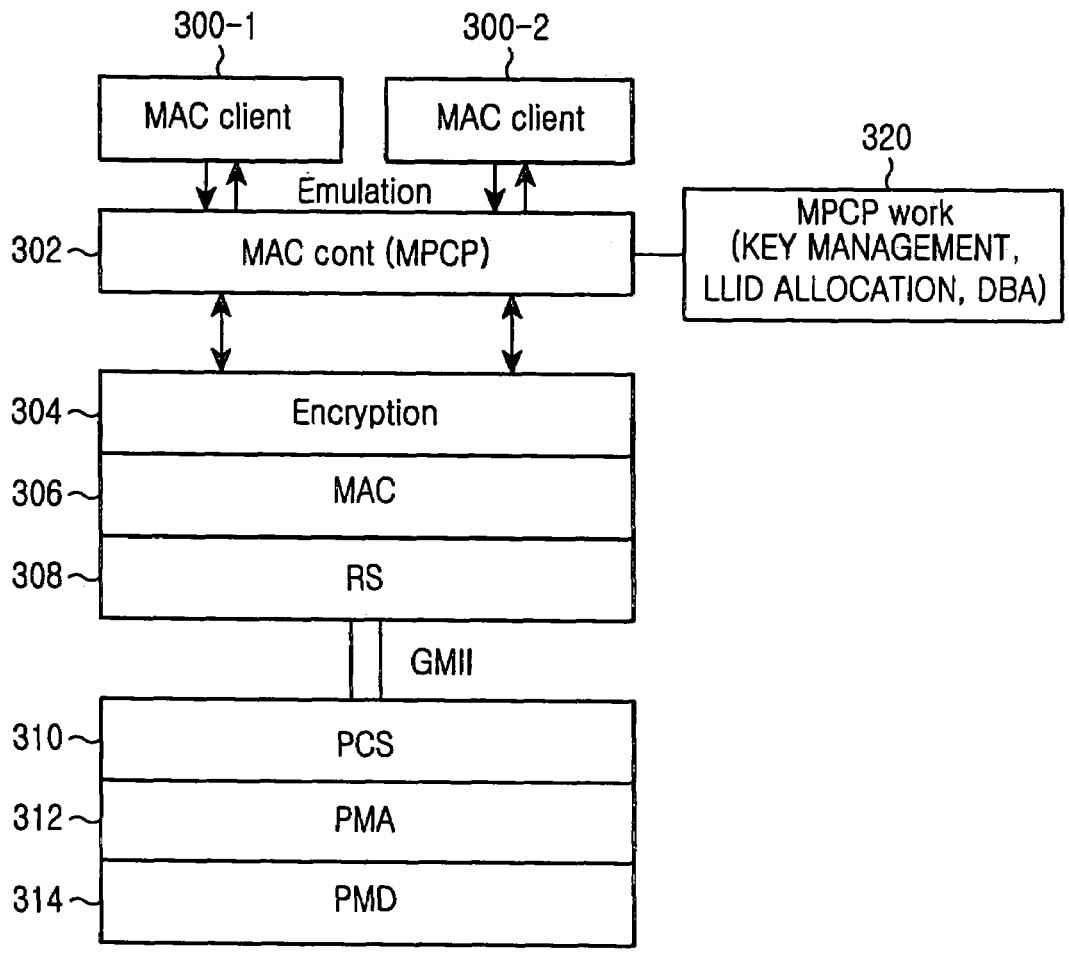
FIG. 3 illustrates a protocol stack representing a layer responsible for encryption in an EPON according to an embodiment of the present invention.

FIG. 3 illustrates a protocol stack representing a layer responsible for encryption in an EPON according to an embodiment of the present invention.

As shown in FIG. 3, there are MAC client layers 300-1 and 300-2, a MAC control layer 302, a MAC layer 306, an RS layer 308, a physical coding sublayer (PCS) layer 310, a physical medium attachment (PMA) layer 312, and a physical medium dependent sublayer (PMD) layer 314. An encryption layer 304 according to the present invention is under the MAC client layers 300-1 and 300-2 or the MAC control layer 302.

Figure 1:
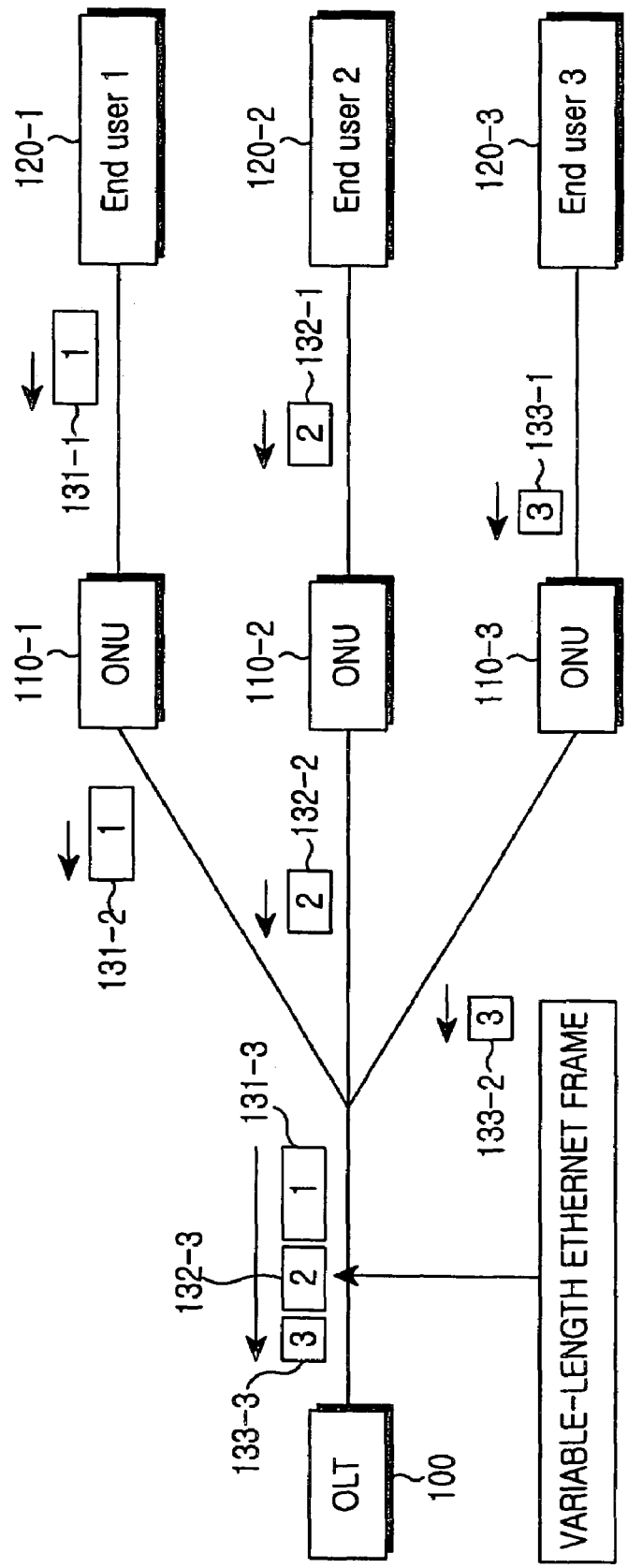
FIG. 1 illustrates the configuration of a typical PON.

Referring back to FIG. 1, the ONUs 110-1 to 110-3 share different secret keys with the OLT 100 after registration and authentication. The ONUs 110-1 to 110-3 and the OLT 100 can enhance security by periodically renewing the secret keys based on a secret master key during a rekeying process. For simplicity, the description of the rekeying process is not provided here as it is well known to artisans.

Those entities having different keys can be identified by a logical link IDs (LLIDs). That is, the LLIDs correspond to the respective ONUs 110-1 to 110-3. If one ONU has a plurality of logical links, the LLIDs correspond to each of the logical links. In other words, the LLIDs can be assigned to the respective end users 120-1 to 120-3. Thus, an LLD is an authentication and key distribution unit.

Each ONU or logical link encrypts a message using its stored key. Message transmission is triggered by the MAC client layers 300-1 and 300-2 and the message is transferred to the encryption layer 304. The encryption layer 304 checks the message integrity depending on the encryption enable/disable mode, inserts an IC field representing the message integrity check value, encrypts the ICV filed and payload, and inserts an encryption frame tag in the message. The encryption processing time may change an RTT (Round Trip Time), which represents a measure of the time it takes for a packet to travel a round trip. Therefore, an encryption engine preferably performs a parallel processing irrespective of the packet length. It is also preferred that an encryption-disable packet is subject to the same process delay as the encryption processing in order to ensure a fixed RTT.

Figure 4:
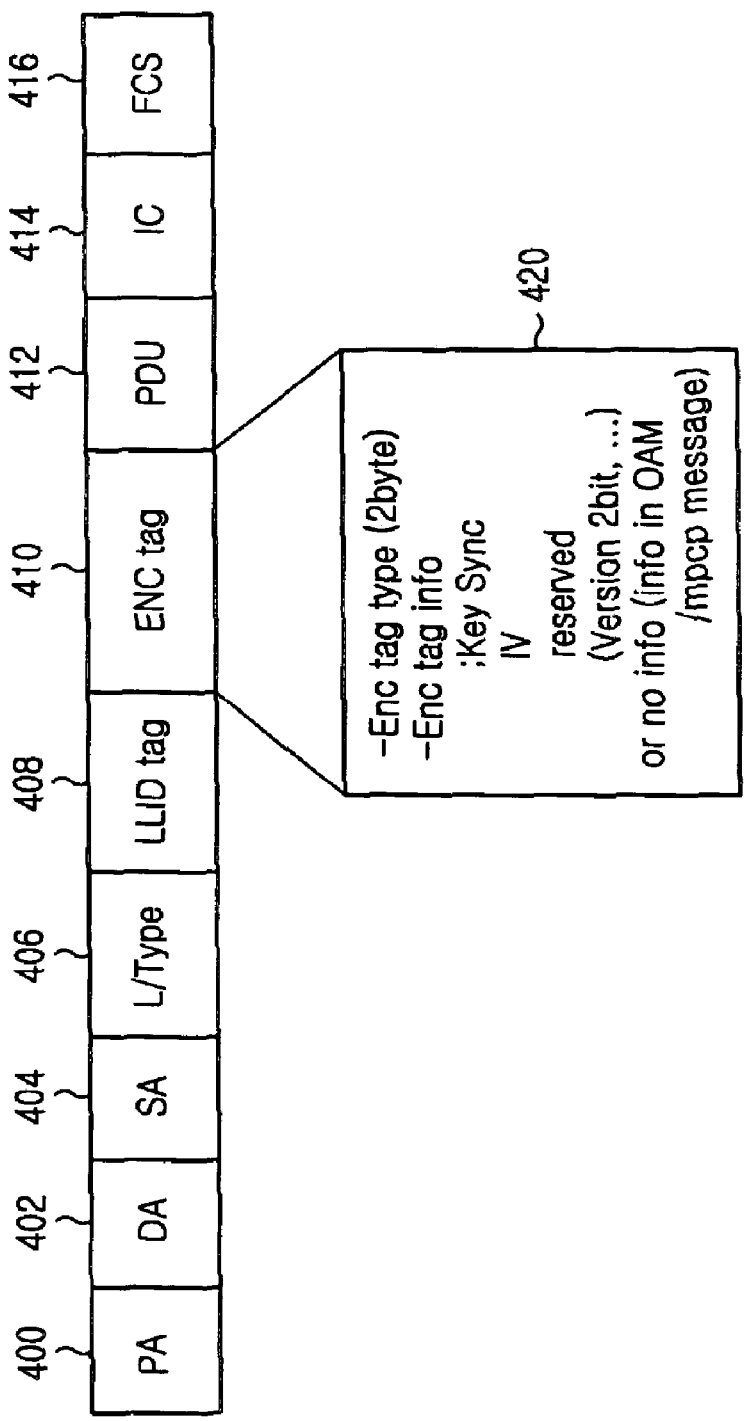
FIG. 4 illustrates an Ethernet frame format configured to carry out an encryption function according to the embodiment of the present invention; and, FIG. 5 illustrates frame areas to be encrypted according to the embodiment of the present invention.

FIG. 4 illustrates an Ethernet frame format configured to carry out an encryption function according to the embodiment of the present invention.

As shown in FIG. 4, the inventive Ethernet frame format comprises a PA (PreAmble) field 400, a DA (Destination Address) field 402, an SA (Source Address) field 404, an L/Type (Length/Type) field 406, an LLID tag field 408, an Enc tag (Encryption tag) field 410, a PDU (Packet Data Unit) field 412, an IC field 414, and an FCS field 416.

An LLID is used to identify a corresponding entity during the authentication and key distribution. The LLID can be loaded in a frame along with an LLID tag type, or it can be included in the frame by tagging after the LLID is transmitted in a preamble. The Enc tag field 410 indicates the encryption enable/disable mode of the frame. As shown in FIG. 4, a block 420 can be incorporated into the Enc tag field 410. The Enc tag field 410 can have an Enc tag type field and an Enc tag info field. The Enc tag info provides information required for encryption/decryption. It may include information about key synchronization or version. Since some encryption modes need an initialization vector (IV) serving as a seed for a key, the Enc tag info may further include the IV. Note that if the Enc tag info is transmitted through an OAM (Operation, Administration and Maintenance) message or other control messages, the Enc tag field 410 has only the tag type field without the Enc tag info.

A message including the Enc tag field 410 represents an encrypted message, but a message free of the Enc tag field 410 represents an unencrypted message. The PDU field 412 is accompanied by the IC field 414 for checking the integrity of the payload in the PDU field 412. For example, in an OCB (Offset Codeback Mode) mode using an AES (Advanced Encryption Standard) as an encryption algorithm, the IC field 414 corresponds to a check sum. It can be 4 or 10 bytes. Hence, an encryption tagged frame (e.g., encrypted frame) has an additional frame length of Enc tag length+IC length. Lastly, the FCS field 416 is used to determine the presence or absence of errors on a link or a MAC layer.

Furthermore, the signal triggered by the MAC client layers 300-1 and 300-2 and transferred to the encryption layer 304 includes the payload, information about encryption enable/disable, a frame header (DA and SA), and the LLID tag field 408 added by an emulation layer.

Now, a transmission signal going under the encryption procedure is explained hereinafter.

The encryption layer 304 first checks an encryption enable/disable signal. If an encryption-disable message is detected, the encryption layer delays by an encryption processing time in order to ensure a fixed RTT. If an encryption-enable signal, the encryption layer 304 performs an IC on the PDU field 412 and adds the integrity check result to the frame. This IC means a check sum such as CRC (Cyclic Redundancy Check). The encryption layer 304 then checks an LLID and retrieves a key corresponding to the LLID from a registry in the master that manages keys for authentication and encryption. It encrypts the PDU field 412 and the IC field 414 using the key value as an input for an encryption algorithm. The encryption layer 304 inserts a tag type indicating an encrypted message and an information field containing encryption information in the block 420. The MAC layer 306 performs an FCS check over all frame areas including the encrypted areas and adds the FCS field 416 representing the FCS value to the frame.

A received message is decrypted in the following procedure. In general, the decryption is the reverse process of the encryption. The MAC layer 306 first performs an FCS on all frame areas from the PA 400 to IC 414 including encrypted areas in the received message, compares the resulting FCS value with a value set in the FCS field 416, and transmits the comparison result to a higher layer by a signal receive_status together with the frame free of the FCS field 416. The encryption layer 304 checks an LLID from the LLID tag field 408 and an Enc tag type from the Enc tag field 410 in the frame received from the MAC layer 306. If the Enc tag type indicates encryption disable, the frame is delayed by a decryption processing time in order to ensure a fixed RTT. On the other hand, if an encryption-enable message is detected, the encryption layer 304 checks the LLID and retrieves a key corresponding to the LLID from a registry in a master that manages keys. It decrypts the PDU field 412 and the IC field 414 based on information from the Enc tag info of the Enc tag field 410 and the retrieved key in a decryption algorithm. If encryption or decryption is carried out using a key other than the key corresponding to the LLID, the value of the decrypted field is different from the original field value. Thus, an IC value is different from the value of the IC field 414. If the IC value of the decrypted PDU field 412 is different from the value of the IC field 414, that is, if it is determined that the message is not from an authenticated source having the LLID, the encryption layer 304 increases the count of a message integrity break counter and discards the corresponding packet. If they are identical, the encryption layer 304 transmits the frame free of the Enc tag field 410 to a higher layer.

Figure 5:
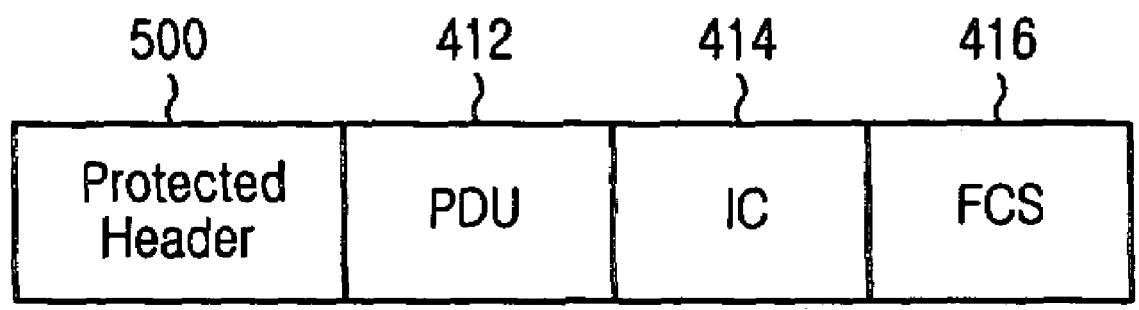

FIG. 5 illustrates frame areas to be encrypted according to the embodiment of the present invention.

The PDU field 412 and the IC field 414 in a frame are subject to encryption. If the check sum of the PA field 400 to the IC field 414 in the encrypted packet is identical to the value of the FCS field 416 and thus the packet passes an FCS check, this implies that no errors are caused by defects on the link or MAC layer. After decryption, if the check sum of the PDU field 412 in the plaintext is identical to the value of the IC field 414 meaning that the encryption is not performed, this implies that the encryption was performed using a right key, thereby verifying the integrity of the message or its source. Accordingly, link errors are distinguished from unauthenticated key encryption, facilitating link management.

As described above, LLIDs are assigned to different network devices (e.g., ONUs, subscribers, etc.) sharing a common medium (e.g., OLT) in the point-to-multipoint network. Thus, they are identified by their respective LLIDs and security communications are carried out using the LLIDs. The IC field 414 is added to the transmission frame after an IC, the frame including up to the IC field 414 is encrypted, a FCS check is performed on the encrypted frame, and the FCS field 416 is added to the frame prior to transmission. By performing these steps, message integrity errors can be distinguished from link errors as explained above.

Meanwhile, a protected header 500, which is added during the encryption process and canceled during the decryption process, covers the L/Type field 406, the LLIF tag field 408, and the Enc tag field 410 illustrated in FIG. 4.

In accordance with the present invention, an encryption mechanism for authentication and guaranteeing privacy has been defined to assign different keys to network modules or associated logical links, and encrypt data using the keys in a tree-structured network. Therefore, unstable security, which is a problem encountered with a tree-structured network for transmission using a common medium, can be overcome.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting data securely from a source point to a target point in a point-to-multipoint communication network, the method comprising the steps of:
   (a) forming an encryption tag field including information relating to an encryption tag type indicating whether transmission data is encryption-enabled or encryption-disabled and an encryption tag information field for providing information relating to one of a key synchronization, a version, and an initialization vector (IV) of an optical network unit;
   (b) forming a packet data field including encrypted transmission data;
   (c) forming a first integrity check field indicating a CRC (Cyclic Redundancy Check) check sum of the encrypted transmission data;
   (d) forming a second integrity check field indicating a check sum of the transmission frame and adding the second integrity check field to the transmission frame for a subsequent transmission and,
   (e) forming a transmission frame including the formed fields from steps (a)-(d), a source address field indicating the address of the source point and a destination address field indicating fine address of the target point.

2. The method of claim 1, further comprising the steps of:
   (g) receiving and performing a first integrity check on the transmission frame using the second integrity check field;
   (h) decrypting the transmission frame without the second integrity check field; and,
   (i) performing a second integrity check on the decrypted transmission frame using the first integrity check field.

3. The method of claim 2, wherein the transmission frame is decrypted according to the destination address field of the decryption step (h).

4. The method of claim 2, further comprising the step (j) of determining whether the check sum of the transmission frame is identical to the value of the second integrity check field of the first integrity check step (g).

5. The method of claim 4, if the check sum is identical, determining that there is no link error in the point-to-multipoint communication network.

6. The method of claim 2, further comprising the step of determining whether the check sum of the encrypted transmission data of the transmission frame is identical to the value of the first integrity check field of the second integrity check step (i).

7. The method of claim 6, if the check sum is identical, determining that the transmission data is originated from an authenticated network device.

8. The method of claim 1, further comprising the step of transmitting the encryption tag information field via an operation, administration and maintenance (OAM) message.

9. The method of claim 8, wherein, if the encryption tag information field is transmitted via the OAM message, forming the encryption tag field in the step (a) with only the encryption tag type field.

10. The method of claim 1, further comprising forming a length and type field indicating the sum of the lengths of the packet data field and the first integrity check field.

11. The method of claim 9 wherein in step (a) the encryption tag field further includes encryption tag information field for providing information relating to one of a key synchronization, a version, and an initialization vector (IV) of an optical network unit.

* * * * *